Jan. 3, 1933.  A. G. O'NEILL  1,892,901
COLOR SCREEN AND PROCESS OF MAKING SAME
Filed Sept. 6, 1929
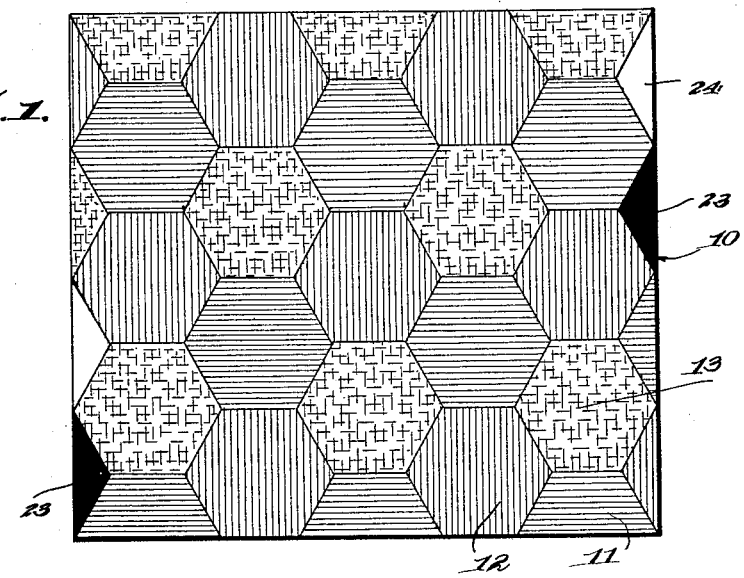
Fig. 1.
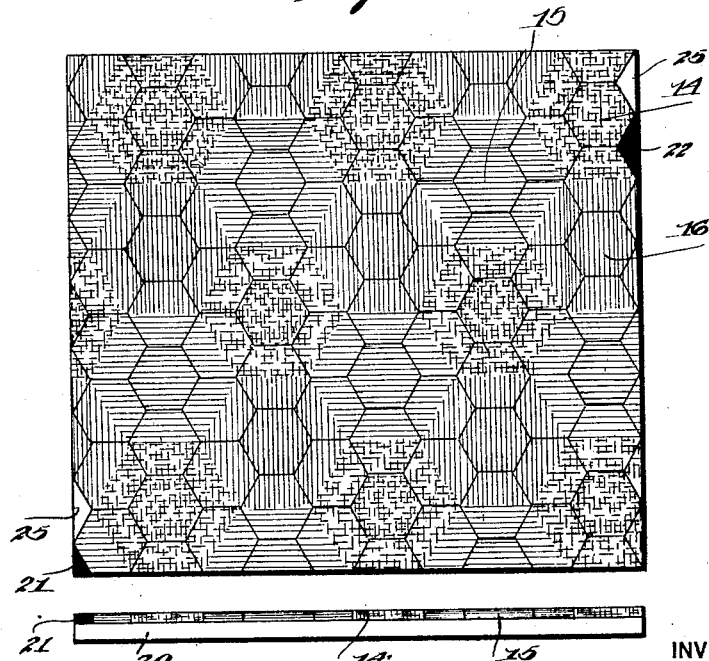
Fig. 2.
Fig. 3.
INVENTOR
A. G. O'Neill,
BY
ATTORNEY Patented Jan. 3, 1933

1,892,901

UNITED STATES PATENT OFFICE

AUGUSTINE G. O'NEILL, OF TULSA, OKLAHOMA

COLOR SCREENS AND PROCESS OF MAKING SAME

Application filed September 6, 1929. Serial No. 390,769.

This invention relates to color screens and a process for making the same for use in color photography.

An object of the invention is the provision of a process for producing color screens for use in photography by partially fusing and welding together bundles of rods formed of siliceous materials; the rods forming a welded mass which is drawn out further, if desired, to reduce the cross-sectional area thereof, while being partially fused and welded; after this operation said welded mass being sawed transversely with suitable metal saws carrying diamond dust or other abrasives to produce thin cross-sections thereof.

Another object of the invention is the provision of a process for producing mosaic color screens, in which the screens are formed of a plurality of welded sections of transparent particles of various colors and formed from a bundle of rods which are welded and drawn and cut transversely in thin sheets, said sheets being secured or fused on a transparent member to which is to be applied the photographic emulsion, and the further grinding and polishing of said colored sheets to extreme practicable thinness before applying any photographic emulsion thereto.

A further object of the invention is the provision of a process for producing mosaic color screen plates in which the individual mosaic color particles may be made as small as desired for practical purposes, the small diameters of the particles being rendered possible through the welding together and drawing out of masses of welded rods of various colors.

A still further object of the invention is the provision of a mosaic color screen composed of small colored mosaic particles of any regular geometric polygonal shape, the adjacent edges of the particles, when desired, being blended into each other to provide a partial merging of the colors.

This invention will be best understood from a consideration of the following detailed description, in connection with the accompanying drawing; nevertheless, it is to be understood that this invention is not confined to the disclosure, being susceptible of such changes and modifications as shall define no material departure from the salient features of the invention as expressed in the appended claims.

In the drawing:—

Figure 1 is a transverse section of a bundle of rods fused together.

Figure 2 is a transverse section of a bundle of rods showing the colors blended together by fusion.

Figure 3 is an end view of the device shown in Fig. 2 disclosing a thin transverse section which has been ground and polished.

Referring more particularly to the drawing 10 designates a thin sheet cut transversely from a mass of rods which have been partially fused and welded together and in which the rods 11 are of a yellow color, while rods 12 are red and rods 13 having a blue color. Such colors are all produced by mineral pigments so that as these rods are partially fused and welded into a solid mass the original colors are not entirely destroyed or changed.

Referring to Fig. 2, it will be seen that the yellow rod 14 has been welded with the adjoining or surrounding rods in such a manner in conjunction with the fusion of the red rod 15 and blue rod 16, that the colors of the red, blue and yellow will be so blended with the surrounding mass of colored material that a predetermined smaller pattern of yellow, rod and blue will appear at intervals, with the intermediate adjoining colors blended into each other in order to produce various shades such as green, orange and purple.

The mosaic color screen plates shown in Figures 1 and 2 are made by stacking together in regular color pattern small cylinders of hexagonal rods or transparent colored glass or other transparent mineral or siliceous material and heating the stacked rods in air or in a vacuum until they partially fuse and become welded together. One or more opaque black marker rods contiguous to one or more transparent marker rods are inserted at different points in the bundles of rods. These rods are employed for identification and for facilitating effective superposing of photographic plates with each other or of the mosaic color screen plates with the photographic plates, films or emulsions.

The preferred form of the rods is hexagonal in cross section. However, cylindrical rods may be employed in bundles and heated in a vacuum until they partially or completely fuse and assume a hexagonal shape, thus filling all of the interstices between the cylindrical rods. Preferably the rods are manufactured in hexagonal form by forcing molten colored glass or siliceous material through a composite diamond die formed by polishing and fitting together six diamond pieces in such a manner that the hole of the die forms a small but true hexagon in cross section. By this method of manufacture the dies may be made to produce color rods having true hexagonal cross sections of a diameter of one tenth to one twentieth of an inch in the initial state.

After the hexagonal color rods are produced by the method noted above, said rods may be reduced to almost any microscopic cross sectional area by heating the bundles of colored rods arranged in the desired color pattern until such bundles become soft and viscous and partially fused or become welded together when such mass of viscous material may be drawn out to any desired cross sectional area. Due to the high viscosity and the proper control of the temperature, each colored portion in such mass of colored viscous material may be drawn out to an extremely small cross sectional area without losing entirely color identity or cross sectional shape.

The welded colored mass is annealed and sawed transversely in thin sheets to form screens. These sheets are ground and polished to provide a plane surface, after which the polished plane surface of such sheets are then welded or cemented to plane surfaced bases of polished transparent glass or other colored transparent mineral or siliceous material. These mosaic color screens are then reduced to a minimum thickness by further grinding and polishing of the colored portion thereof. In this instance it is possible to produce a mosaic color screen having a thickness of one-hundredth to one one-thousandth of an inch.

In order to control perfectly the process of welding or cementing the cut and polished mosaic color screens to bases of clear transparent glass or other mineral or siliceous material, and in order to avoid additional fusing and blurring of the pattern, the material in the transparent colorless plate may be so constructed or manufactured that it will readily fuse and obtain a certain measured viscosity at a temperature slightly below the temperature of fusion, or at or slightly below the degree of viscosity of the mosaic color screen.

Larger finished mosaic color screens may be made by adjusting and welding together several masses of welded and drawn colored material before cutting and polishing the cross section, as shown more particularly in Fig. 2. The finished mosaic color screen plates may be used for direct photography by placing the colored side of the plates in contact with or closely adjacent to a panchromatic or ortho-chromatic photographic plate, film or emulsion, or by coating the colored side of the mosaic color screen directly with the photographic emulsion.

In making an exposure for color photography, a photographic light is passed through the colorless transparent portion of the mosaic color screen plate and then through the colored portion of the mosaic screen before affecting the photographic emulsion. If the photographic emulsion is deposited directly upon the mosaic color screen, the negative image is developed and bleached out and the reverse positive image is produced by a redevelopment of the photographic emulsion. If the mosaic color screen plate is used with a separate photographic plate or film, the photographic light is passed through the colorless portion of the mosaic color screen plate, then through the mosaic color screen before the photographic emulsion is affected; then, after exposure of the photographic emulsion, the black and white negative images are developed on separate plates or films in the usual manner and any number of black and white positive transparent prints may be made from such negative and viewed as transparencies by superposing the positive properly upon the original color screen plate or any color screen plate of identical geometric color pattern, or they may be viewed in such superposition by projection through a lantern slide or motion picture machine upon a projection screen.

The transparent color mosaic screen plates may contain a regular geometric pattern arrangement of either the three primary optical colors of orange-red, yellow-green and blue-violet, or the primary optical colors combined in small geometric patterns with pure red, yellow, blue and/or with all of the principal intermediate shades of colors in the visible spectrum of sunlight.

The color screen being ground down sufficiently thin, must be mounted on a support 20 which is a transparent member formed of suitable material. It will be noted that the plate shown in Fig. 1 is provided with opaque markers 23 and transparent markers 24. The plate shown in Fig. 2 is provided with markers 21, 22 and 25, the markers 21 and 22 being of opaque material, while the markers 25 are transparent. These markers serve the purpose of aiding in registering the screen either with a plate or film for photographic purposes or with a film when used in connection with moving pictures, by mounting such mosaic color screen in a suitable holder inside of a motion picture camera or projector with the color side of the mosaic color screen plate in front of and closely adjacent (but not contiguous) to photographic emulsion or film of such motion picture camera or projector.

I claim:—

1. A step in the method of producing mosaic color screens for use in photography, which comprises partially fusing and welding together bundles of differently colored rods of transparent material to form a welded mass; and then drawing out the welded mass to reduce the cross sectional area thereof, and sawing the welded and annealed mass transversely in thin sheets to produce color screens.

2. A step in the method of producing mosaic color screens for use in photography, which comprises partially fusing and welding together bundles of differently colored rods, heating the welded rods until said rods become a substantially viscous mass while controlling the shape and size of the cross sections of the colored rods, annealing the mass, and cutting the annealed mass transversely into thin sheets.

3. The method of forming mosaic color screens for use in photography which comprises melting colored glass or siliceous material, passing said material through a die to produce rods of small diameter, forming bundles of the rods of various colors, heating the bundle of rods until such rods become soft and viscous and welding said rods together to form a mass; then drawing the welded mass out while reducing the cross sectional area of the welded mass, annealing the drawn out rods, then sawing the welded mass transversely into thin sheets.

4. The method of forming mosaic color screens for use in photography which comprises melting glass or siliceous material, passing said material through a die to produce rods of small diameter, forming bundles of the rods of various colors and welding said rods together to form a welded mass; then drawing the welded or fused mass out while reducing the cross-sectional area of the mass, annealing the drawn out mass, then cutting the mass transversely into thin sheets.

5. A step in the method of producing mosaic color screens for use in photography which comprises fusing together bundles of differently colored rods of regular geometric cross-sectional shape and size of transparent material to form a welded mass, then drawing out the welded mass, of rods to reduce the cross-sectional area thereof, and cutting the bundle of rods transversely into thin sheets.

6. A step in the method of producing mosaic color screens for use in photography, which comprises partially fusing and welding together bundles of differently colored rods of transparent material to form a welded mass; and then drawing out the welded mass to reduce the cross-sectional area thereof; sawing the welded mass transversely in thin sheets to provide mosaic color screens, and affixing a transparent sheet of material to a thin sheet of the mosaic color screen.

7. A step in the method of producing mosaic color screens for use in photography which comprises partially fusing and welding together bundles of differently colored rods of transparent material to form a welded mass; and then drawing out the welded mass to reduce the cross-sectional area thereof; sawing the welded mass transversely in thin sheets to provide mosaic color screens, and affixing a transparent sheet of material to a thin sheet of the mosaic color screen, and then grinding and polishing the mosaic color screen to the proper thickness.

8. Mosaic color screens formed from transverse cuts of a welded and drawn out mass of bundles of differently colored rods of transparent material, each screen being in the form of a thin sheet composed of minute colored particles, each particle having the same shape and size as the cross-sectional area of a drawn out rod from which the particles have been cut.

9. Mosaic color screens formed from transparent cuts of a welded and drawn out mass of bundles of differently colored rods of transparent material, each screen being in the form of a thin sheet composed of minute colored particles, each particle having the same shape and size as the cross-sectional area of a drawn out rod from which the particles have been cut, the colored particles being arranged in regular groups, certain of the particles being distinguished from the other particles to provide markers for predeterminately positioning one screen on the other.

10. The process of manufacturing mosaic color screens for use in photography, which comprises partially fusing and welding together bundles of differently colored longitudinally juxtaposed rods of transparent material to form a welded mass, and then drawing out the welded mass vertically in the direction of the longitudinal juxtaposition of said rods to reduce the cross-sectional area of said mass, annealing the mass, cutting the welded and annealed mass transversely into thin flat sheets to produce color screens containing variegated colors; grinding and polishing to a plane surface one flat face of each mosaic color screen sheet so produced; affixing such plane surface of said sheet to an inflexible transparent plane-surfaced supporting base; further grinding and polishing the other flat face of such mosaic color screen sheet to a plane surface parallel to the first plane surface of said mosaic color screen sheet.

Signed at Washington in the District of Columbia this 5th day of September A. D. 1929.

AUGUSTINE G. O'NEILL.